United States Patent
Flesch et al.

(10) Patent No.: US 9,199,345 B2
(45) Date of Patent: Dec. 1, 2015

(54) METHOD FOR PRODUCING A METAL REINFORCEMENT FOR A TURBINE ENGINE BLADE

(75) Inventors: Thierry Jean Emile Flesch, Pringy (FR); Jean-Franøois Fromentin, Cesson la Forêt (FR); Stéphane André Leveque, Marcoussis (FR); Laetitia Sanchez, Crisenoy (FR)

(73) Assignee: SNECMA, Paris (FR)

( * ) Notice: Subject to any disclaimer, the term of this patent is extended or adjusted under 35 U.S.C. 154(b) by 554 days.

(21) Appl. No.: 13/518,179

(22) PCT Filed: Dec. 22, 2010

(86) PCT No.: PCT/EP2010/070576
§ 371 (c)(1),
(2), (4) Date: Jun. 21, 2012

(87) PCT Pub. No.: WO2011/076890
PCT Pub. Date: Jun. 30, 2011

(65) Prior Publication Data
US 2012/0255176 A1  Oct. 11, 2012

(30) Foreign Application Priority Data
Dec. 23, 2009  (FR) ...................... 09 59551

(51) Int. Cl.
*B23P 15/04* (2006.01)
*B22F 3/105* (2006.01)
(Continued)

(52) U.S. Cl.
CPC .............. *B23P 15/04* (2013.01); *B22F 3/1055* (2013.01); *B22F 5/009* (2013.01); *B23K 15/006* (2013.01);
(Continued)

(58) Field of Classification Search
CPC ... B23P 15/04; F05D 2240/121; B29C 66/53; B22F 2003/153
USPC ................... 29/402.01–401.08, 889.1, 889.7, 29/889.71; 416/224, 229 A
See application file for complete search history.

(56) References Cited

U.S. PATENT DOCUMENTS

| | | | |
|---|---|---|---|
| 3,430,898 A | 3/1969 | Parechanian et al. |
| 4,010,530 A | 3/1977 | Delgrosso et al. |

(Continued)

FOREIGN PATENT DOCUMENTS

| | | |
|---|---|---|
| EP | 1 489 264 A1 | 12/2004 |
| EP | 1 574 270 A1 | 9/2005 |

(Continued)

OTHER PUBLICATIONS

International Search Report as issued for PCT/EP2010/070576.

*Primary Examiner* — Sarang Afzali
*Assistant Examiner* — Ruth G Hidalgo-Hernande
(74) *Attorney, Agent, or Firm* — Pillsbury Winthrop Shaw Pittman LLP

(57) ABSTRACT

A method for creating a metal reinforcement for a leading or trailing edge of a turbine engine blade including a reinforcement foot and head, the method including: creating a plurality of V-shaped tapered elements that form different parts of the metal reinforcement so that the metal reinforcement is divided into a plurality of parts distributed between the foot and the head; positioning the parts on equipment that is shaped like the leading or trailing edge of the turbine engine blade; and rigidly connecting the different parts so as to form the complete profile of the one-piece metal reinforcement the by recombining the different parts.

18 Claims, 3 Drawing Sheets

(51) Int. Cl.
| | |
|---|---|
| *B22F 5/00* | (2006.01) |
| *B23K 15/00* | (2006.01) |
| *B23K 37/047* | (2006.01) |
| *C22C 14/00* | (2006.01) |
| *F01D 5/14* | (2006.01) |
| *F01D 5/28* | (2006.01) |
| *F04D 29/32* | (2006.01) |
| *B22F 3/24* | (2006.01) |
| *B29C 65/00* | (2006.01) |
| *B29L 31/08* | (2006.01) |
| *B29C 65/48* | (2006.01) |

(52) U.S. Cl.
CPC .............. *B23K 37/047* (2013.01); *C22C 14/00* (2013.01); *F01D 5/147* (2013.01); *F01D 5/282* (2013.01); *F04D 29/324* (2013.01); *B22F 2003/247* (2013.01); *B22F 2003/248* (2013.01); *B22F 2998/10* (2013.01); *B23K 2201/001* (2013.01); *B29C 65/48* (2013.01); *B29C 65/483* (2013.01); *B29C 65/484* (2013.01); *B29C 66/12461* (2013.01); *B29C 66/12463* (2013.01); *B29C 66/301* (2013.01); *B29C 66/53* (2013.01); *B29C 66/721* (2013.01); *B29C 66/742* (2013.01); *B29L 2031/08* (2013.01); *B29L 2031/082* (2013.01); *F05D 2230/234* (2013.01); *F05D 2230/236* (2013.01); *F05D 2240/121* (2013.01); *F05D 2240/303* (2013.01); *F05D 2300/702* (2013.01); *Y10T 29/4998* (2015.01); *Y10T 29/49318* (2015.01); *Y10T 29/49826* (2015.01)

(56) References Cited

U.S. PATENT DOCUMENTS

| | | | | |
|---|---|---|---|---|
| 4,326,833 | A | * | 4/1982 | Zelahy et al. ............... 416/96 R |
| 4,944,655 | A | * | 7/1990 | Merz ............................. 416/61 |
| 6,532,656 | B1 | * | 3/2003 | Wilkins et al. .............. 29/889.1 |
| 6,800,829 | B1 | * | 10/2004 | Nimmons .................. 219/69.17 |
| 7,789,621 | B2 | * | 9/2010 | Dierksmeier et al. ........ 415/191 |
| 2002/0148115 | A1 | * | 10/2002 | Burke et al. ................ 29/889.1 |
| 2007/0075188 | A1 | * | 4/2007 | Stoner et al. ............... 244/134 D |
| 2007/0163114 | A1 | | 7/2007 | Johnson |
| 2009/0050735 | A1 | * | 2/2009 | Sobol ............................ 244/1 A |
| 2012/0114494 | A1 | * | 5/2012 | Ford et al. ................ 416/229 R |

FOREIGN PATENT DOCUMENTS

| | | |
|---|---|---|
| EP | 1 908 919 A1 | 4/2008 |
| EP | 2 060 343 A1 | 5/2009 |
| EP | 2 125 339 B1 | 2/2012 |
| JP | 61-164002 | 7/1986 |
| RU | 2 297 538 C2 | 4/2007 |

\* cited by examiner

METHOD FOR PRODUCING A METAL REINFORCEMENT FOR A TURBINE ENGINE BLADE

CROSS REFERENCE TO RELATED APPLICATIONS

This application is the U.S. National Stage of PCT/EP2010/070576, filed Dec. 22, 2010, which in turn claims priority to French Patent Application No. 0959551, filed Dec. 23, 2009, the entire contents of all applications are incorporated herein by reference in their entireties.

FIELD

The present invention relates to a method for producing a metal reinforcement for a composite or metal turbine engine blade.

More particularly, the invention relates to a method for producing a metal reinforcement for the leading edge of a turbine engine blade.

The field of the invention is that of turbine engines and more specifically that of fan blades, made of composite or metal material, of a turbine engine and whereof the leading edge comprises a metal structural reinforcement.

However, the invention is also applicable to produce a metal reinforcement intended to reinforce a trailing edge of a turbine engine blade.

BACKGROUND

It will be recalled that the leading edge corresponds to the front part of an aerodynamic profile which faces the air flow and which divides the air flow into a lower-surface air flow and an upper-surface air flow. The trailing edge corresponds to the rear part of an aerodynamic profile where the lower-face and upper-face flows are united.

It is known to provide the fan blades of a turbine engine, produced in composite materials, with a metal structural reinforcement extending over the whole height of the blades and beyond their leading edge, as mentioned in document EP 1908919. Such a reinforcement permits the composite blades to be protected during an impact of a foreign body on the fan, such as for example a bird, hail or else stones.

In particular, the metal structural reinforcement protects the leading edge of the composite blade by preventing risks of delamination, fibre rupture or damage due to fibre/matrix de-cohesion.

Conventionally, a turbine engine blade comprises an aerodynamic surface extending, in a first direction, between a leading edge and a trailing edge and, in a second direction essentially perpendicular to the first direction, between a foot and a head of the blade. The metal structural reinforcement assumes the shape of the leading edge of the aerodynamic surface of the blade and extends in the first direction beyond the leading edge of the aerodynamic surface of the blade assuming the shape of the profile of the lower face and the upper face of the blade and in the second direction between the foot and the head of the blade.

In a known manner, the metal structural reinforcement is a metal part produced entirely by milling from a block of material.

However, the metal reinforcement of a leading edge of a blade is a part that is complex to produce, requiring numerous complex reworking and tooling operations involving high production costs.

SUMMARY

In this context, the invention aims to solve the aforementioned problems by proposing to a method of producing a metal reinforcement for the leading edge or the trailing edge of a turbine engine blade, enabling the production costs of such a part to be significantly reduced and the production range to be simplified.

For this purpose, the invention proposes a method for producing a metal reinforcement for the leading edge, or the trailing edge, of a turbine engine blade, comprising a reinforcement foot and a reinforcement head, said method consecutively comprising:
- a step for producing a plurality of V-shaped tapered elements that form different sectors of said metal reinforcement, so that said metal reinforcement is divided into a plurality of sectors distributed between said foot and said head;
- a step for positioning said sectors on a tool that is shaped like said leading edge or said trailing edge of said turbine engine blade;
- a step for rigidly connecting the different sectors so as to form said complete profile of said one-piece metal reinforcement by recombining the different sectors.

Thanks to the invention, the metal structural reinforcement is produced in a straightforward and rapid manner from a plurality of sectors which are then rigidly connected so as to form a one-piece complete reinforcement.

The manufacture of the metal reinforcement by recombining the plurality of sectors produced independently makes it possible to avoid the deviations associated with the one-piece manufacture of such a part, and in particular at the thin sides of the reinforcement which have a tendency to twist.

The step for producing a plurality of sectors of the reinforcement in fact makes it possible to limit the stresses built up in the part during the process of manufacture and thus the deformation of the thin-walled sides during the removal of the part from the tool.

The method of production thus makes it possible to be free from the complex manufacture of the reinforcement by milling in the body from one-piece flat bars requiring a large volume of material to be used and consequently high costs for the supply of the initial material.

The method according to the invention also makes it possible to reduce considerably the production costs of such a part.

The method for producing a metal reinforcement for a turbine engine blade according to the invention can also comprise one or more of the undermentioned features, considered individually or in all technically possible combinations:
- during said step for producing a plurality of elements that form said sectors of said metal reinforcement, each sector is produced by means of a laser fusion process;
- said step for rigidly connecting the different sectors is carried out by means of a diffusion brazing process;
- the method comprises a hot-forming step carried out simultaneously with said rigid connecting step;
- the method comprises a step for demolding of said metal reinforcement from said tool, said tool being formed by a plurality of removable sections, said demolding being carried out by successive withdrawal of said removable sections;
- the method comprises a step for finishing said metal reinforcement consisting in a sub-step for polishing the surface of said reinforcement and/or in a sub-step for reworking the sides of said reinforcement;

said step for rigidly connecting the different sectors is carried out by means of a welding process; in this case, said step for rigidly connecting the different sectors is advantageously followed consecutively by:

a step for positioning said rigidly connected sectors forming said reinforcement on a tool that is shaped like said leading edge or said trailing edge of said turbine engine blade;

a heat treatment step for relaxing the stresses;

a hot-forming step;

a step for demolding of said metal reinforcement from said tool, said tool being formed by a plurality of removable sections distributed between said foot and said head of said reinforcement;

a step for finishing said metal reinforcement consisting in a sub-step for polishing the surface of said reinforcement and/or in a sub-step for reworking the sides of said reinforcement.

The subject-matter of the invention is also a method for repairing a turbine engine blade comprising a worn metal reinforcement of the leading edge or the trailing edge of said blade, said method comprising:

a step for disconnecting said worn metal reinforcement from said blade;

a step for producing a metal reinforcement of the leading edge or trailing edge of a turbine engine blade according to the invention, a step of rigidly connecting said metal reinforcement, produced during the preceding step, to said turbine engine blade.

The subject-matter of the invention is also a tool for performing the method for producing a metal reinforcement of a turbine engine blade according to the invention comprising a plurality of removable sections.

The tool according to the invention can also have one or more of the following features, considered individually or in all technically possible combinations:

said tool comprises a number of removable sections greater than the number of reinforcement sectors;

said tool is produced in a material having an expansion coefficient greater than the expansion coefficient of the material of said reinforcement.

BRIEF DESCRIPTION OF THE DRAWINGS

Other features and advantages of the invention will emerge more clearly from the description thereof given below, by way of indication and on no account limiting, making reference to the appended figures, amongst which.

In all the figures, common elements have the same reference numbers unless stated to the contrary.

DETAILED DESCRIPTION

Figure 1:
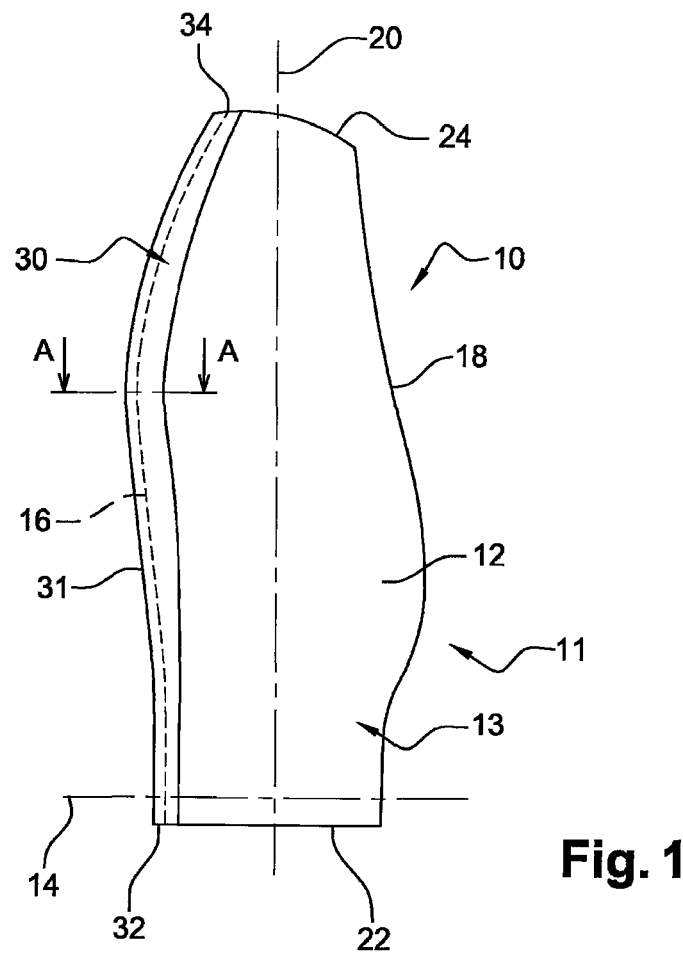
FIG. 1 is a side view of a blade comprising a metal structural reinforcement of the leading edge obtained by means of the method of production according to the invention.

FIG. 1 is a side view of a blade comprising a metal structural reinforcement of the leading edge obtained by means of the method of production according to the invention.

Illustrated blade 10 is for example a mobile fan blade of a turbine engine (not represented).

Blade 10 comprises an aerodynamic surface 12 extending in a first axial direction 14 between a leading edge 16 and a trailing edge 18 and in a second radial direction 20 essentially perpendicular to first direction 14 between a foot 22 and a head 24.

Aerodynamic surface 12 forms an upper surface 13 and a lower surface 11 of blade 10, upper surface 13 of blade 10 being represented in FIG. 1. Lower surface 11 and upper surface 13 form the lateral faces of blade 10 which connect leading edge 16 to trailing edge 18 of blade 10.

In this embodiment, blade 10 is a composite blade typically obtained by draping a woven composite material. By way of example, the composite material used can comprise an assembly of woven carbon fibres and a resin matrix, the assembly being formed by moulding by means of a resin injection process under vacuum of the RTM type (standing for "Resin Transfer Molding").

Blade 10 comprises a metal structural reinforcement 30 glued at its leading edge 16 and which extends both in first direction 14 beyond leading edge 16 of aerodynamic surface 12 of blade 10 and in second direction 20 between foot 22 and head 24 of the blade.

Figure 2:
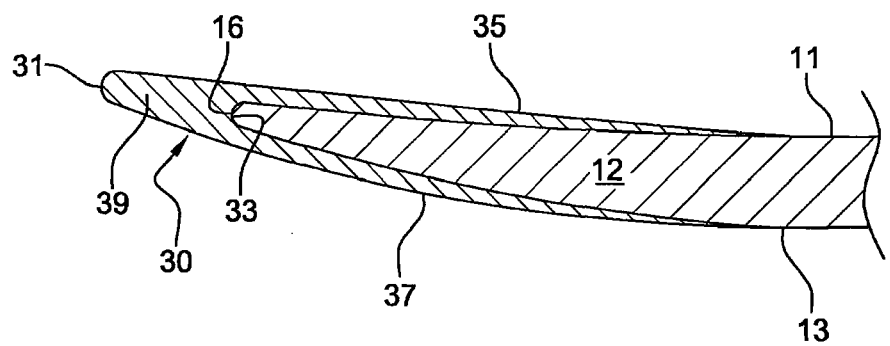
FIG. 2 is a partial cross-sectional view of FIG. 1 in a plan view of cross-section AA.

As represented in FIG. 2, structural reinforcement 30 assumes the shape of leading edge 16 of aerodynamic surface 12 of blade 10 which it extends to form a leading edge 31, so-called leading edge of the reinforcement.

Conventionally, structural reinforcement 30 is a one-piece part comprising an essentially V-shaped section having a base 39 forming leading edge 31 and extended by two lateral sides 35 and 37 respectively assuming the shape of lower surface 11 and upper surface 13 of aerodynamic surface 12 of the blade. Sides 35, 37 have a profile that tapers or thins out in the direction of the trailing edge of the blade.

Base 39 has a rounded internal profile 33 capable of assuming the rounded shape of leading edge 16 of blade 10.

Structural reinforcement 30 is metallic and preferably titanium-based. This material in fact has a great capacity for energy absorption due to impacts. The reinforcement is glued on blade 10 by means of glue known to the person skilled in the art, such as for example a cyanoacrylic glue or epoxy glue.

This type of metal structural reinforcement 30 used for the reinforcement of a composite turbine engine blade is more particularly described notably in patent application EP 1908919.

Figure 6:
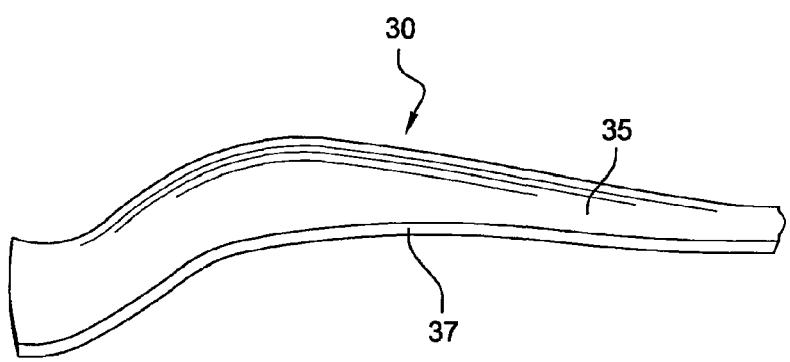
FIG. 6 is a view of the metal reinforcement of the leading edge of a turbine engine blade in its final state obtained by the method of creation according to the invention illustrated in FIG. 3.

The method according to the invention makes it possible to produce a structural reinforcement such as illustrated in FIGS. 1, 2 and 6, FIGS. 2 and 6 illustrating reinforcement 30 in its final state.

Figure 3:
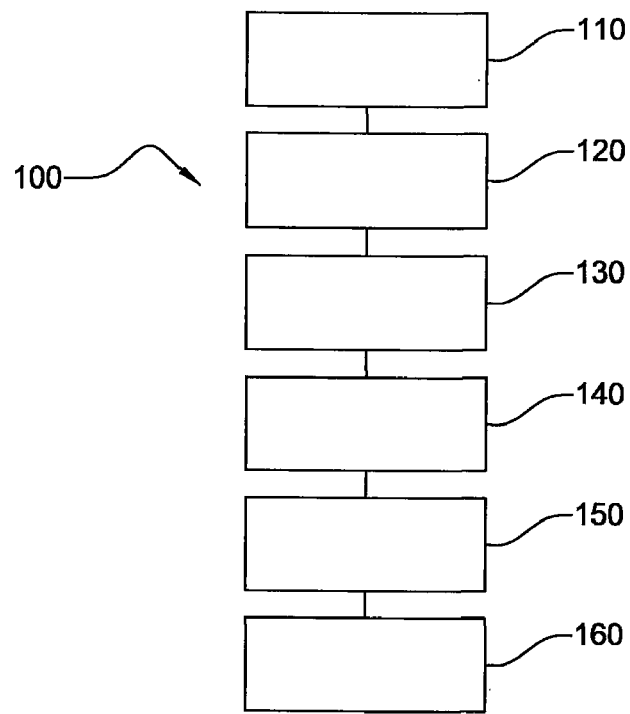
FIG. 3 is a block diagram showing the main steps for producing a metal structural reinforcement of the leading edge of a turbine engine blade of the method of production according to the invention.

FIG. 3 represents a block diagram illustrating the main principles of a method of production 100 of a metal structural reinforcement 30 of the leading edge of a blade 10 as illustrated in FIGS. 1 and 2.

First step 110 of method of creation 100 is a step for producing a plurality of sectors 30a, 30b, 30c, 30d of metal reinforcement 30.

Figure 4:
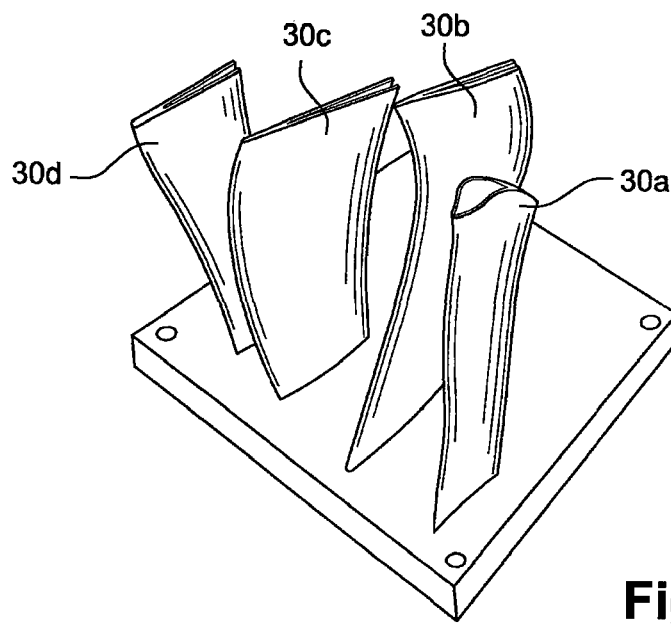
FIG. 4 is a view of the metal reinforcement of the leading edge of a turbine engine blade during the first step of the method illustrated in FIG. 3.

FIG. 4 illustrates in particular different sectors 30a, 30b, 30c, 30d obtained during first step 110.

For this purpose, metal reinforcement 30 is previously divided into a plurality of sectors during the design or during the construction of a numeric model.

According to an advantageous embodiment of the invention, different sectors of reinforcement 30 are created independently by a rapid prototyping process, and more particularly by a laser fusion process. The laser fusion is in fact a process which makes it possible to create each sector of reinforcement 30 by the deposition of a plurality of successive material layers, which makes it possible to create in an easy manner the complex shapes and in particular the tapered V-shape of metal reinforcement 30 with small thicknesses at sides 35, 37.

The laser fusion process, or the process of sintering by laser fusion, is a process known to the person skilled in the art and dealt with in numerous patents, such as in particular patents EP 2060343 or EP 2125339; consequently, we do not describe in further detail the functioning principle of this method of manufacture.

The creation of metal reinforcement 30 by recombining a plurality of sectors 30a, 30b, 30c, 30d makes it possible to avoid the deviations associated with the manufacture of such a part all in one from a one-piece flat bar, and in particular to avoid twisting of sides 35, 37 of small thickness.

Each sector 30a, 30b, 30c, 30d, created in first step 110, forms a part of base 39, of leading edge 31 and of sides 35, 37 of final reinforcement 30.

Figure 5:
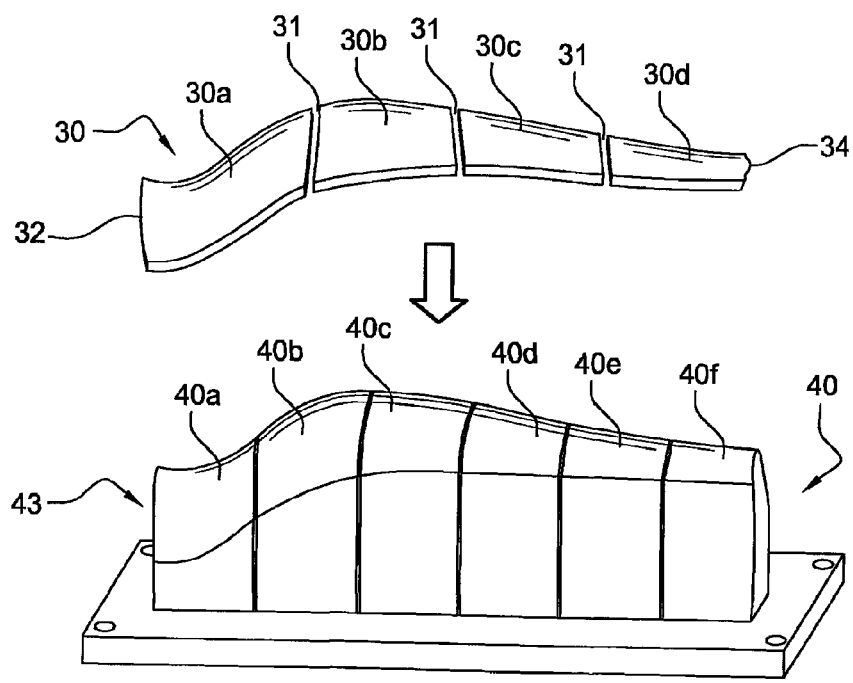
FIG. 5 is a view of the metal reinforcement of the leading edge of a turbine engine blade during the second step of the method illustrated in FIG. 3.

Second step 120 of method of production 100 is a step for positioning different sectors 30a, 30b, 30c, 30d on a specific moulding tool 40 with a view to the recombination. This second step 120 for positioning is illustrated by FIG. 5.

Tool 40 is formed by the association of a plurality of sections 40a, 40b, 40c, 40d, 40e, 40f which cooperate together in such a way as to form a mould cavity 43 complementary with internal profile 33 of reinforcement 30. Mould cavity 43 of tool 40 essentially corresponds to the profile of blade 10 when different sections 40b, 40c, 40d, 40e, 40f are assembled.

Thus, during the second step, different sectors 30a, 30b, 30c, 30d of reinforcement 30 are positioned sector by sector on tool 40 in such a way as to construct in its entirety the profile of the reinforcement on the tool. The shape of tool 40 and, in particular, the profile of mould cavity 43 are produced in such a way as to form the desired shape and lower-surface and upper-surface profile of metal reinforcement 30.

To advantage, tool 40 comprises a number of sections greater than the number of sectors of reinforcement 30.

Third step 130 of method of production 100 is a step for assembling, or rigidly connecting, different sectors 30a, 30b, 30c, 30d of reinforcement 30 by a diffusion brazing process. To do this, joints 31 present between each adjoining sector 30a, 30b, 30c, 30d are filled by brazing cords obtained by diffusion brazing from a filler metal in strip form or in powder form. This filler metal makes it possible to connect rigidly different sectors 30a, 30b, 30c, 30d in order to form a one-piece reinforcement 30 with its final profile.

It will be recalled that diffusion brazing is an operation consisting in causing the filler metal to migrate completely into the base material until the disappearance of the melted filler metal part.

Diffusion brazing makes it possible in particular to obtain excellent results for the assembly of machined parts which are relatively small and have complex profiles.

Fourth step 140 of method of creation 100 is a step for hot-forming carried out in the same molding tool 40 as in the preceding steps, the tool then being placed in a furnace heated to the forging temperature of the materials used.

This hot-forming step makes it possible to form reinforcement 30 with a view to obtaining its final shape.

Tool 40 is preferably produced in a material having an expansion coefficient greater than the expansion coefficient of the material of the reinforcement. By way of example, tool 40 can be produced in steel when the reinforcement is produced on a titanium base. The profile of tool 40 and the dimensions of tool 40 are designed so as to take account of the withdrawal of the different materials used.

According to a preferred embodiment of the invention, hot-forming step 140 is carried out during diffusion brazing step 130.

Fifth step 150 is a step for the demolding of said reinforcement 30 from tool 40. For this purpose, different sections 40a, 40b, 40c, 40d, 40e, 40f of tool 40 are removable and capable of being dismantled individually in such a way as to facilitate the demolding of the reinforcement 30.

In order to facilitate the demolding, it is possible to prepare tool 40 initially by depositing a protection layer on mould cavity 43 of tool 40 in such a way as to avoid reinforcement 30 sticking to tool 40. By way of example, this protection layer can be an aluminium layer.

Finally, sixth step 160 of method of production 100 is a step for finishing and reworking reinforcement 30 by machining. This finishing step 160 consists particularly in:
  reworking sides 35, 37; the step consists in particular in trimming sides 35, 37 and in thinning-out lower-surface and upper-surface sides 35, 37;
  polishing reinforcement 30 in order to obtain the required surface state.

FIG. 6 illustrates reinforcement 30 in its final state obtained by the method of production according to the invention.

In association with these main production steps, the method according to the invention can also comprise steps for non-destructive control of reinforcement 30, permitting the geometrical and metallurgical conformity of the obtained assembly to the ensured. By way of example, the non-destructive controls can be carried out by an x-ray method.

According to a second embodiment of the invention, the step for assembly, or rigid connection, of the various reinforcements by diffusion brazing is replaced by a step for assembling the various reinforcements by welding, for example by means of an electron beam.

In this second embodiment, the step for assembly by welding is carried out without the use of a moulding tool. This step occurs following the step for creating the different sectors of the reinforcement.

Thus, in this second embodiment, the method for producing a metal structural reinforcement 30 of the leading edge of blade 10 as illustrated in FIGS. 1 and 2 comprises:
  a first step for producing a plurality of sectors 30a, 30b, 30c, 30d of the metal reinforcement, for example by a laser fusion process;
  a second step for assembly by welding of different sectors 30a, 30b, 30c, 30d constituting the different parts of the reinforcement;
  a third step for positioning said sectors 30a, 30b, 30c, 30d rigidly connected together on a tool forming the internal mould cavity of the reinforcement and having the profile of the leading edge of the turbine engine blade;

a fourth heat treatment step for relaxing the stresses;
a fifth hot-forming step;
a sixth step for demolding of metal reinforcement 30 from the tool, the tool being divided into different removable sections so as to facilitate the demolding of reinforcement 30;
a step for finishing metal reinforcement 30 consisting in a sub-step for polishing the surface of the reinforcement and/or a sub-step for reworking the sides of reinforcement 30.

The method according to the invention has been described mainly for a metal structural reinforcement on a titanium base; however, the method according to the invention is also applicable with materials on a nickel base or on a steel base.

The invention has been described in particular for the production of a metal reinforcement of a composite turbine engine blade; however, the invention is also applicable to the production of a metal reinforcement of a metal turbine engine blade.

The invention has been described in particular for the production of a metal reinforcement of a leading edge of a turbine engine blade; however, the invention is also applicable to the creation of a metal reinforcement of a trailing edge of a turbine engine blade.

The invention has been described in particular with a laser fusion process for the implementation of the first step; however, the first step can be implemented for example by another prototyping process or by a machining process.

The interest in implementation by laser fusion of the reinforcement by means of a plurality of independent sectors makes it possible to limit the stresses built up in the part during the method of manufacture by laser fusion and thus the deformation of the thin-walled sides during the withdrawal of the part from the tool. The reinforcement in fact has thin-walled sides which, the greater the size of the part, tend to become deformed during the withdrawal of the part from the tool.

The method of producing a metal reinforcement according to the invention can be integrated perfectly into an overall process for repairing a composite or metal turbine engine blade. A method for repairing a turbine engine blade thus consists in:
a first step for disconnecting the worn metal reinforcement by pyrolysis means, permitting the glue or the resin to be heated to a temperature of the order of 100 to 400° C. in order to soften and/or degenerate the glue used to rigidly connect the metal reinforcement to the turbine engine blade;
a second step for creating a new metal reinforcement according to the invention;
and finally a third step for rigidly connecting the metal reinforcement, produced in the preceding step, by gluing by means of a glue known to the person skilled in the art for gluing a reinforcement to a blade, such as for example a cyanoacrylic glue or an epoxy glue.

The other advantages of the invention are in particular the following:
reduction of production costs;
reduction of production time;
simplification of the production range;
reduction of material costs.

The invention claimed is:

1. A method for producing a metal reinforcement for a leading edge or a trailing edge of a turbine engine blade, comprising a reinforcement foot and a reinforcement head, said method comprising:
producing a plurality of V-shaped tapered elements that form different sectors of said metal reinforcement, so that said metal reinforcement is divided into a plurality of sectors distributed between said foot and said head;
combining said sectors by positioning said sectors on a molding tool that is shaped like said leading edge or said trailing edge of said turbine engine blade;
and rigidly connecting the different sectors positioned on the tool so as to form a complete profile of said metal reinforcement by recombining the different sectors.

2. The method for producing a metal reinforcement for a turbine engine blade according to claim 1, wherein each sector is produced by a laser fusion process.

3. The method for producing a metal reinforcement for a turbine engine blade according to claim 1, wherein said connecting is carried out by a diffusion brazing process.

4. The method for producing a metal reinforcement for a turbine engine blade according to claim 3, comprising hot-forming the metal reinforcement simultaneously with said connecting.

5. The method for producing a metal reinforcement for a turbine engine blade according to claim 3, comprising demolding said metal reinforcement from said tool, said tool being formed by a plurality of removable sections, said demolding being carried out by successive withdrawal of said removable sections.

6. The method for producing a metal reinforcement for a turbine engine blade according to claim 5, comprising finishing said metal reinforcement by polishing a surface of said reinforcement and/or reworking sides of said reinforcement.

7. The method for producing a metal reinforcement for a turbine engine blade according to claim 1, wherein said connecting is carried out by a welding process.

8. The method for producing a metal reinforcement for a turbine engine blade according to claim 7, wherein after said connecting the method comprises: positioning said rigidly connected sectors forming said reinforcement on the tool that is shaped like said leading edge or said trailing edge of said turbine engine blade; heat treating the metal reinforcement for relaxing stresses; hot-forming the metal reinforcement; demolding said metal reinforcement from said tool said tool being formed by a plurality of removable sections distributed between said foot and said head of said reinforcement; finishing said metal reinforcement by polishing the surface of said reinforcement and/or reworking the sides of said reinforcement.

9. A method for repairing a turbine engine blade comprising a worn metal reinforcement of the leading edge or the trailing edge of said blade, said method comprising:
disconnecting said worn metal reinforcement from said blade;
producing a metal reinforcement of the leading edge or trailing edge of the turbine engine blade according to claim 1, and
rigidly connecting said metal reinforcement to said turbine engine blade.

10. The method for producing a metal reinforcement for a leading edge or a trailing edge of a turbine engine blade according to claim 1, wherein said tool is formed by a plurality of removable sections.

11. The method for producing a metal reinforcement for a leading edge or a trailing edge of a turbine engine blade according to claim 10, comprising a number of removable sections greater than the number of sectors of the reinforcement.

12. The method for producing a metal reinforcement for a leading edge or a trailing edge of a turbine engine blade according to claim 10, wherein said tool is produced in a material having an expansion coefficient greater than an expansion coefficient of said reinforcement material.

13. A method for producing a metal reinforcement for a leading edge or a trailing edge of a turbine engine blade, the metal reinforcement comprising a first end and a second end, said method comprising:
  producing a plurality of tapered elements that form different sectors of said metal reinforcement, so that said metal reinforcement is divided into a plurality of said different sectors distributed between said first end and said second end;
  positioning said sectors on a molding tool that has a shape similar to that of said leading edge or said trailing edge of said turbine engine blade, and connecting the different sectors positioned on the tool together so as to form a complete one-piece profile of said metal reinforcement.

14. The method for producing a metal reinforcement for a turbine engine blade according to claim 13, wherein each sector is produced by a laser fusion process.

15. The method for producing a metal reinforcement for a turbine engine blade according to claim 13, wherein said connecting is carried out by a diffusion brazing process.

16. The method for producing a metal reinforcement for a turbine engine blade according to claim 13, comprising hot-forming the metal reinforcement simultaneously with said connecting.

17. The method for producing a metal reinforcement for a turbine engine blade according to claim 13, comprising demolding said metal reinforcement from said tool, said tool being formed by a plurality of removable sections, said demolding being carried out by successive withdrawal of said removable sections.

18. The method for producing a metal reinforcement for a turbine engine blade according to claim 13, comprising polishing a surface of said reinforcement and/or reworking sides of said reinforcement.

\* \* \* \* \*

UNITED STATES PATENT AND TRADEMARK OFFICE
CERTIFICATE OF CORRECTION

| | | |
|---|---|---|
| PATENT NO. | : 9,199,345 B2 | Page 1 of 1 |
| APPLICATION NO. | : 13/518179 | |
| DATED | : December 1, 2015 | |
| INVENTOR(S) | : Thierry Jean Emile Flesch et al. | |

It is certified that error appears in the above-identified patent and that said Letters Patent is hereby corrected as shown below:

On title page, Item (75) Inventors:

Please correct the second inventor's name to read:

Jean-<u>François</u> FROMENTIN

Signed and Sealed this
Eighth Day of March, 2016

Michelle K. Lee
*Director of the United States Patent and Trademark Office*